United States Patent

Wagner

[11] 3,909,623
[45] Sept. 30, 1975

[54] SUPPLY DEVICE FOR SUPPLY CONDUCTORS OF HIGH FREQUENCY EQUIPMENT AND THE LIKE

[75] Inventor: Heinz Wagner, Regensburg, Germany

[73] Assignee: Siemens Aktiengesellschaft, Berlin & Munich, Germany

[22] Filed: Sept. 27, 1973

[21] Appl. No.: 401,191

[30] Foreign Application Priority Data
Oct. 4, 1972 Germany............................ 2248700

[52] U.S. Cl.................................... 307/93; 333/79
[51] Int. Cl.[2]......................................... H01H 3/22
[58] Field of Search ............... 307/93, 105; 333/79

[56] References Cited
UNITED STATES PATENTS
3,603,902  9/1971  Denes ................................. 333/79
3,638,144  1/1972  Denes ................................. 333/79

*Primary Examiner*—David Smith, Jr.
*Attorney, Agent, or Firm*—Hill, Gross, Simpson, Van Santen, Steadman, Chiara & Simpson

[57] ABSTRACT

A suppressor device for the supply conductors of electrical and electronic equipment of the type generating high frequencies, as well as being utilizable as a line suppressor for shielded spaces, in which a metal housing is divided by two partition walls into three successive high frequency shielded chambers with multiple leadthrough capacitors being provided in the respective partition walls, and a current-compensated ring-core choke and a rod-core being disposed in the central chamber, one of the leadthrough capacitors, the ring-core choke, the rod-core choke and the other of the leadthrough capacitors being connected in series.

3 Claims, 1 Drawing Figure

U.S. Patent   Sept. 30,1975   3,909,623
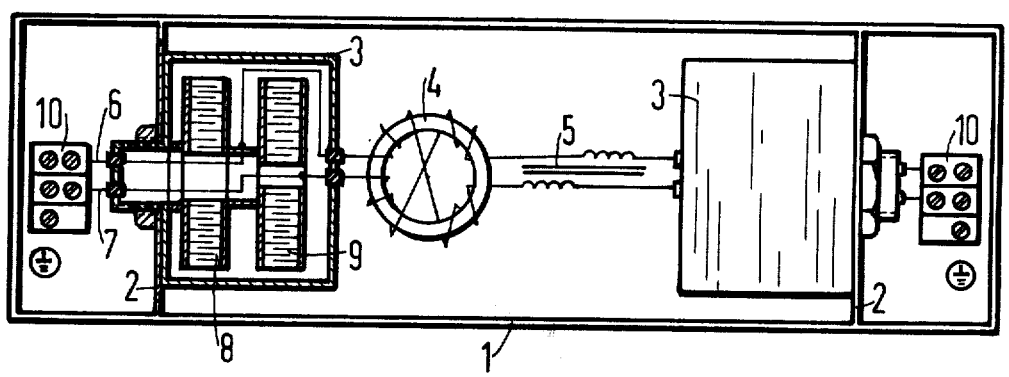

SUPPLY DEVICE FOR SUPPLY CONDUCTORS OF HIGH FREQUENCY EQUIPMENT AND THE LIKE

BACKGROUND OF THE INVENTION

The present invention is directed to a suppressor device for the supply conductors of electrical and electronic equipment of the type generating high frequencies, the device also being utilizable as a line suppressor for shielding spaces. The device is provided with a metal housing which is divided by two partition walls into three successive high frequency screened chambers containing choke coils, capacitors and connecting terminals.

In German PS No. 899 686, multiple leadthrough capacitors are described which are particularly intended for shunting the symmetrical and asymmetrical interference components on two-wire or multi-wire lines, the leadthrough capacitors, arranged side by side, one above the other or one after the other, being connected with one another through tubes or the like, in such a fashion that an uninterrupted, metallic partition wall separated into electrically isolated sections purely by the capacitors, is produced between the space in which the interference is present and the interference-free space, with the connecting lines extending through this arrangement in such a fashion that each of them passes through one of the mutually isolated sections of the partition wall, without perforating it.

In German As No. 1 076 192, there is described a suppressor circuit for electrical power transmission stations, with plate grounding, the suppressor capacitors being represented simply by a capacitor arranged between the phase conductor and the neutral conductor, and a capacitor between the neutral conductor and the grounded line. As only small voltges occur between the neutral conductor and the grounded line in this known arrangement of the suppressor capacitors there is the advantage that the ground conductor carries virtually no current.

For suppressor units with attenuation values of around 50 dB in the range from 0.15 to 300 Mc/s, solutions are already known in which, by the introduction of current-compensated ring-core chokes, good electrical values and small dimensions have been achieved, German-OS No. 20 30 360). An increase in the attenuation range solely by an increase in the inductances and capacitances, is out of the question because the inevitable lead inductances would give rise to resonance effects and thus to gaps in the attenuation range.

The object of the present invention is to improve known BCI suppressor units of the type which, in a frequency range from 150 Kc/s to 10 Gc/s, enable attenuation levels of around 100 dB to be achieved.

BRIEF SUMMARY OF THE INVENTION

The desired objective of the invention is achieved in a device employing a metal housing divided by two partition walls into three successive high frequency shielded chambers, by the insertion of leadthrough capacitors in the partition walls and providing in the central chamber a current-compensated ring-core choke and a multiple rod-core choke, with one of the leadthrough capacitors, the ring-core choke, the rod-core choke and the other of the leadthrough capacitor, being connected in series.

The coaxial design of the suppressor capacitors provides adequate attenuation levels even at high frequencies, while the connection of the capacitors (one between phase and neutral conductors and one between neutral conductor and housing) avoids the development of a high shunt current through the protective conductor. By this means it becomes possible for the first time to use current-compensated chokes. Also, if a preceding fault current protection switch is present, of the kind used particularly in modern communications installations and constituting a highly sensitive safety device, it is not effected by this arrangement. The rod-core choke is desirable because the symmetrical suppressor action of current-compensated chokes is only very slight. However, it need only have a very low inductance. Instead of a rod core choke, a ring-core choke which is independent of current but has the same action, can be employed. It has been discovered that a suppressor unit designed in accordance with the invention, is cheaper than known designs, and has a smaller volume.

BRIEF DESCRIPTION OF THE DRAWING

The FIGURE of the drawing illustrates a housing, (with cover equivalent removed) with one of the leadthrough capacitors illustrated in section; and the other components schematically illustrated.

DETAILED DESCRIPTION OF THE INVENTION

Referring to the drawing, a generally rectangularly-shaped housing 1, is divided by two partition walls 2 into a total of three successive high frequency shielded chambers. In the two end chambers, are disposed connecting terminals 10 which are illustrated as connectable to a total of three conductors (phase conductor, neutral conductor and ground). In each of the partition walls 2, is disposed a multiple leadthrough capacitor 3, the lefthand capacitor being illustrated in section, in order to more clearly disclose the construction. Two capacitor sections 8 and 9, are provided, the lefthand electrode of section 8 connected to the casing of the leadthrough capacitor and thus also to the housing of the device, while the righthand electrode thereof is connected to the neutral conductor 6 and to the lefthand electrode of the second capacitor section 9. The righthand electrode of the section 9 is connected to the phase conductor 7. In this fashion, a capacitor is operatively disposed between the phase conductor 7 and the neutral conductor 6, and between the latter and the housing ground.

Following the lefthand leadthrough capacitor 3, there is disposed in the central chamber a current-compensated ring-core choke 4, and as the symmetrical suppressor action of this type of ring-core choke is only very slight, a double rod-core choke 5 is also provided. A second leadthrough capacitor also is provided which is inserted in the righthand partition wall 2.

The invention is not limited to the device, illustrated in the drawing, for the suppression of only two supply conductors as the principle of the circuit and arrangement of the device, are equally applicable to suppression of three-phase lines with three or four supply conductors. All that is necessary is to correspondingly adapt the components to the number of conductors requiring suppression.

I claim as my invention:

1. A suppressor device for at least a pair of supply conductors of a power supply line for supplying electrical power to electrical and electronic equipment of the type generating high frequencies, as well as being utilizable as a line suppressor for shielded spaces, employing a metal housing which is divided by two partition walls into three successive high frequency shielded chambers containing choke coils, capacitors and connecting terminals, characterized in that one multiple lead through capacitor is provided in each partition wall, with a current-compensated ring-core choke and a second rod-core choke being disposed in the central chamber, each choke being operatively connected to both of such conductors, one of said lead through capacitors, the ring-core choke, the second rod-core choke and the other of the lead through capacitors being connected in series.

2. A device according to claim 1, wherein each of said multiple lead through capacitors comprises a pair of capacitor sections, said chokes each having a winding for each conductor, each of the latter being connected in series with a respective winding on each of said chokes, one of said conductors having a capacitor section of each pair disposed between it and the housing, and having the other capacitor section of each pair disposed between it and the other of said conductors.

3. A device according to claim 2, wherein first-mentioned conductor comprises a neutral conductor, and said other of said conductors comprises a phase conductor.

* * * * *